(12) United States Patent
Kato

(10) Patent No.: US 7,595,129 B2
(45) Date of Patent: Sep. 29, 2009

(54) BATTERY PACK HAVING A BATTERY UNIT OF SHEET-SHAPED SECONDARY BATTERIES CONNECTED THROUGH A TERMINAL BLOCK

(75) Inventor: Kouichi Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 10/498,861

(22) PCT Filed: Dec. 24, 2002

(86) PCT No.: PCT/JP02/13422

§ 371 (c)(1),
(2), (4) Date: Aug. 2, 2005

(87) PCT Pub. No.: WO03/056643

PCT Pub. Date: Jul. 10, 2003

(65) Prior Publication Data

US 2006/0166086 A1 Jul. 27, 2006

(30) Foreign Application Priority Data

Dec. 26, 2001 (JP) .............................. 2001-393060
Dec. 26, 2001 (JP) .............................. 2001-393119

(51) Int. Cl.
*H01M 10/16* (2006.01)
(52) U.S. Cl. .................................................. 429/122
(58) Field of Classification Search .................. 429/122
See application file for complete search history.

(56) References Cited

U.S. PATENT DOCUMENTS

| 5,180,644 | A | 1/1993 | Bresin et al. |
| 5,367,431 | A | 11/1994 | Kunishi et al. |
| 5,977,746 | A * | 11/1999 | Hershberger et al. ........ 320/112 |
| 6,822,420 | B2 * | 11/2004 | Kozu et al. ................... 320/107 |
| 2003/0146734 | A1 * | 8/2003 | Kozu et al. ................... 320/107 |

FOREIGN PATENT DOCUMENTS

| EP | 0863564 A1 | 9/1998 |
| EP | 1225646 A1 | 7/2002 |
| JP | 06-251763 | 9/1994 |
| JP | 09-045298 | 2/1997 |
| JP | 10-188942 | 7/1998 |
| JP | 11-162443 | 6/1999 |
| JP | 2000-200593 | 7/2000 |
| JP | 2001-093494 | 4/2001 |
| JP | 2001-126686 | 5/2001 |
| JP | 2001-256936 | 9/2001 |
| JP | 2001-256937 | 9/2001 |
| JP | 2001-265933 | 9/2001 |
| WO | 0169699 | 9/2001 |
| WO | WO 01/69699 * | 9/2001 |
| WO | 0036669 | 6/2002 |

* cited by examiner

Primary Examiner—Mark Ruthkosky
(74) Attorney, Agent, or Firm—Sonnenschein Nath & Rosenthal LLP

(57) ABSTRACT

The present invention is applied to a power supply of a portable personal computer, for instance, to hold sheet-shaped secondary battery cells in a multi-layered arrangement with the same-side surfaces facing each other. In the above configuration, positive terminals and negative terminals of the secondary battery cells are connected to opposite surfaces of a terminal block to provide a series-parallel connection of these secondary batteries through the terminal block.

6 Claims, 3 Drawing Sheets

BATTERY PACK HAVING A BATTERY UNIT OF SHEET-SHAPED SECONDARY BATTERIES CONNECTED THROUGH A TERMINAL BLOCK

BACKGROUND OF THE INVENTION

1. Technical Field

The present invention relates to a battery pack, which is applicable to a power supply of a portable personal computer, for instance. The present invention enables a more thickness reduction in the battery pack of the personal computer etc. as compared with a conventional technology to be attained by holding sheet-shaped secondary battery cells in a multi-layered arrangement with the same-side surfaces facing each other.

2. Background Art

Conventionally, a portable personal computer is adapted to be carried for being used in various places, and is thus fabricated in a small-sized configuration and further in a small-thickness configuration so as to be convenient to carry.

Accordingly, the personal computer is also adapted to hold a driving battery pack in an exchangeable condition, so that an exchange of the battery pack is effected as needed to prevent the personal computer from being placed into a difficult condition in use by running-down of a battery. In addition, the battery pack is also given in a small-thickness configuration to prevent portability from being degraded.

Thus, the battery pack of this kind is configured by a series-parallel connection of secondary battery cells specified as constituent units of the battery pack depending on a supply voltage and a power supply capacity required for the personal computer. Further, in the battery pack, the secondary battery cells are given in the form of a sheet to provide a multi-layered arrangement and further to provide a parallel arrangement so as to meet the series-parallel connection of these secondary battery cells.

By the way, in the battery pack of this kind, there has been a demand for a more thickness reduction.

The battery pack, however, provides the series-parallel connection of more than one secondary battery cell at an inside as needed, so that a complicated connection at the inside is required, and as a result, a remarkable degradation of productivity is predicted, in a case where size and thickness reductions of the battery pack are carried forward in the present situation.

SUMMARY OF THE INVENTION

The present invention has been undertaken in view of the above points and is intended to propose a battery pack, which enables a more thickness reduction in the battery pack of a personal computer etc. as compared with a conventional technology to be attained, more specifically, the battery pack, which enables the thickness reduction to be attained with a simple fabrication work.

To solve the above problems, according to the present invention, a connection of a positive terminal and a negative terminal of each secondary battery cell located at the same side is provided through a terminal block to ensure that secondary battery cell pairs in a multi-layered arrangement with the same-side surfaces facing each other are obtained.

In the secondary battery cells given in the form of a sheet, a bias arises in a thickness. Thereby, the secondary battery cells obtained in an overlap arrangement in the same direction cause the thickness bias to be increased cumulatively, resulting in an increase of the whole thickness. On the contrary, the secondary battery cells obtained in the multi-layered arrangement with the same-side surfaces facing each other enable a thickness reduction to be attained in such a manner that the multi-layered secondary battery cells may cancel the thickness bias each other. Thereby, according to a configuration of the present invention, the secondary battery cell pairs obtained in the multi-layered arrangement with the same-side surfaces facing each other can constitutes a battery pack of a type having a smaller thickness than the conventional technology.

Also, according to the present invention, the terminal block in the above configuration provides a connection of the positive terminals and the negative terminals of the secondary battery cells to lands formed at a surface and a back surface, and also a series-parallel connection of more than one secondary battery cell through a wiring pattern between the lands.

According to the configuration of the present invention, the connection of more than one secondary battery cell to the terminal block may be obtained with a simple work by providing, through the terminal block, the connection of the positive terminal and the negative terminal of each secondary battery cell located at the same side. At this time, the terminal block provides the connection of the positive terminals and the negative terminals of the secondary battery cells to the lands formed at the surface and the back surface and also the series-parallel connection of more than one secondary battery cell through the wiring pattern between the lands, thereby enabling a connection work to be carried out simply and surely, even if a complicated connection of more than one secondary battery cell is required depending on various arrangements of secondary batteries, the number of secondary batteries and the number of secondary battery pairs to be connected in series, etc.

DETAILED DESCRIPTION OF THE PRESENTLY PREFERRED EMBODIMENTS

An embodiment of the present invention will be described in detail in the following with reference to the accompanying drawings appropriately.

(1) Configuration of the Embodiment

Figure 1:
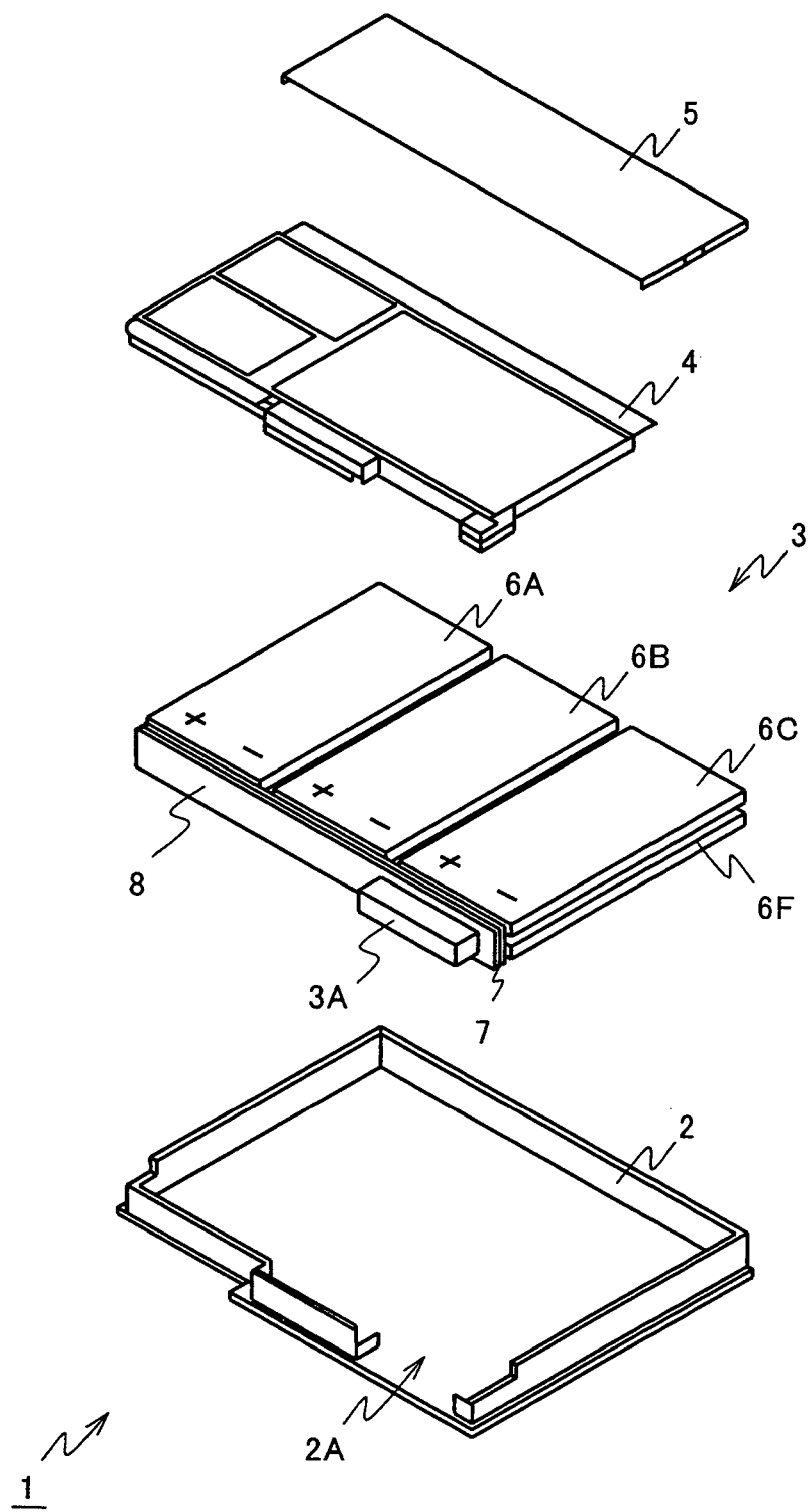
FIG. 1 is an exploded perspective view of a battery pack according to an embodiment of the present invention.

FIG. 1 is an exploded perspective view showing a battery pack according to an embodiment of the present invention. A battery pack 1 of FIG. 1 is mounted to a personal computer to supply power to the personal computer and also to be charged by the personal computer.

Specifically, the battery pack 1 is wholly in the form of a sheet, and is adapted to permit mounting to a back surface of the personal computer to be effected in a sliding manner. The battery pack 1 is formed so that a side specified as an inner side given by the mounting in the sliding manner as described above may have a thickness larger than that of a side opposite to the inner side. The battery pack 1 is fabricated by arranging upper cases 4 and 5 in sequence on a secondary battery unit 3 after the secondary battery unit 3 is housed in a lower case 2.

The lower case 2 used herein is formed by injection molding with a resin material into an approximately rectangular configuration surrounded with wall surfaces. The lower case 2 has a notch 2A in a portion of a major-side wall surface specified as a side that butts against the personal computer. The battery pack 1 is formed so that a connector 3A of the secondary battery unit 3 is exposed to the outside through the notch 2A, thereby providing an electrical connection with the personal computer through the connector 3A.

The secondary battery unit 3 is an assembly product obtained by a connection of sheet-shaped secondary battery cells 6A to 6F applied to the battery pack 1 through a terminal block which will be described later. The upper case 4 is formed by injection molding with a resin material and holds the secondary battery unit 3 with the lower case 2 covered in regard to a large thickness side of the secondary battery unit 3. The upper case 5 is fabricated by applying pressing to a metal sheet material and holds the secondary battery unit 3 with the lower case 2 covered in regard to a small thickness side of the secondary battery unit 3. Thus, the battery pack 1 makes it possible to have a smaller thickness in its entirety by covering the lower case 2 in regard to the large thickness side with the resin-made upper case 4, and the lower case 2 in regard to the small thickness side with the upper case 5 consisting of the metal sheet material as described above.

Thereby, in this embodiment, the lower case 2 and the upper cases 4 and 5 are adapted, in regard to the secondary battery unit 3 obtained by the connection of the sheet-shaped secondary battery cells 6A to 6F through the single terminal block, to form an external case that holds the above secondary battery unit 3 so as to permit the power of the above secondary battery unit 3 to be supplied to an external apparatus through the notch 2A.

Figure 2:
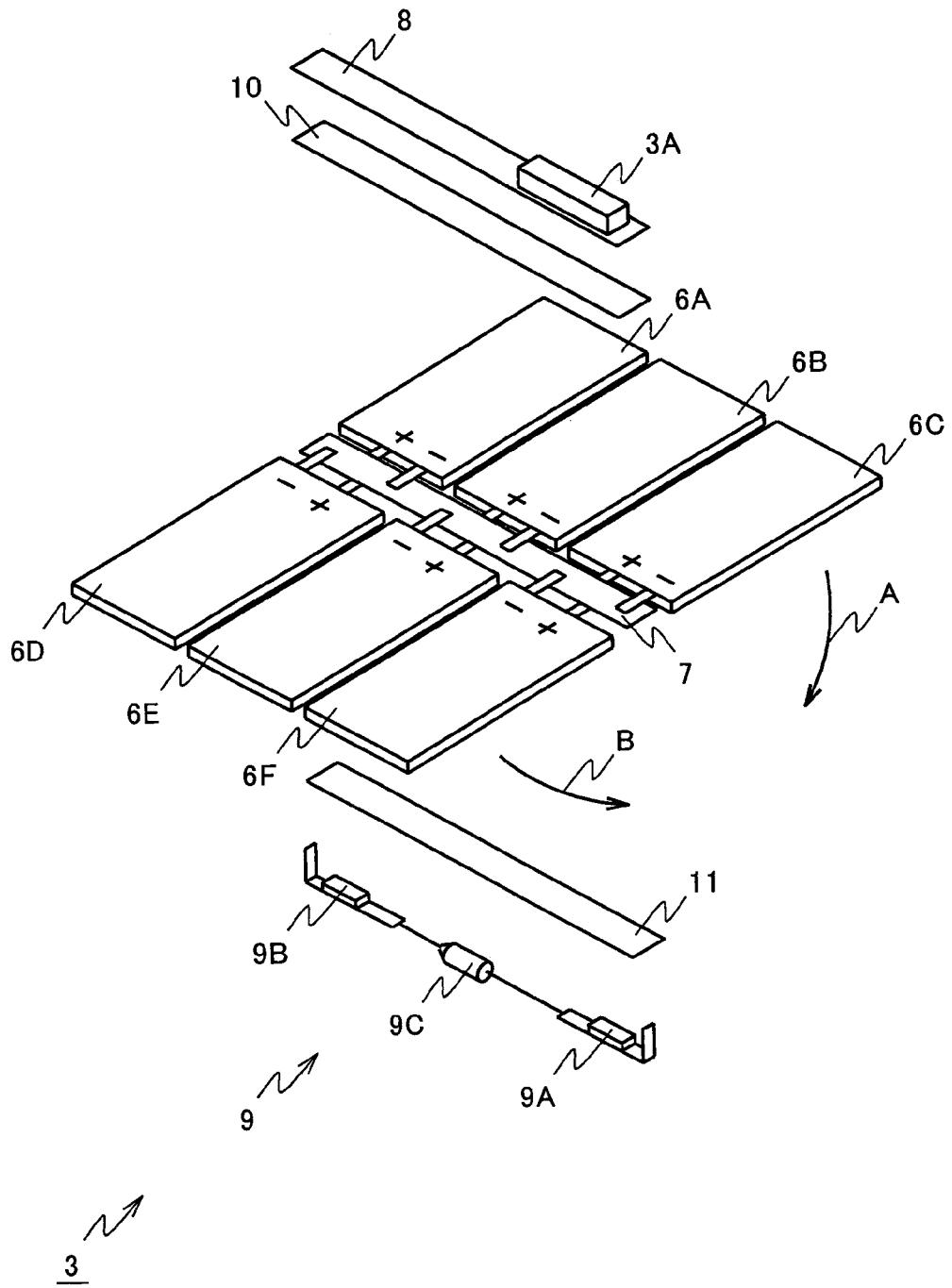
FIG. 2 is an exploded perspective view showing a secondary battery unit in the battery pack of FIG. 1.

FIG. 2 is an exploded perspective view showing the secondary battery unit 3. The secondary battery unit 3 is fabricated by connecting a terminal block 7 and a temperature control component 9 in sequence to a wiring substrate 8 after the connection of the secondary battery cells 6A to 6F to the terminal block 7 is obtained, and then by bending the secondary battery cells 6A to 6F about the terminal block 7 through a terminal portion as shown by arrows A and B. Specifically, in fabrication as described above, the secondary battery unit 3 allows an insulation tape 10 to be arranged between the terminal block 7 and the wiring substrate 8, and also an insulation tape 11 to be arranged between the temperature control component 9 and the terminal block 7, thereby providing an assurance of the safety with these insulation tapes.

The secondary battery cells 6A to 6F used herein are non-aqueous secondary battery cells of the same configuration, and are in the form of a rectangular sheet. The secondary battery cells 6A to 6F allow positive terminals (which are terminals represented by a plus sign given to a root portion) and negative terminals (which are terminals represented by a minus sign given to the root portion) to be located at a minor-side end surface. The secondary battery cells 6A to 6F are configured to have, at a corner of the minor-side surface, the negative terminals, out of the positive terminals and the negative terminals of these secondary battery cells, and at the approximately center of the minor-side surface, the positive terminals. Thereby, the positive terminals and the negative terminals in a one-sided arrangement are obtained so as to be one-sided in a longitudinal direction, with the secondary battery cell side surfaces viewed from the front.

The secondary battery cells 6A to 6F are arranged three at a time closely side by side at the opposite longitudinal sides of the elongated terminal block 7 so that the side surfaces configured with the positive terminals and the negative terminals may face the terminal block 7. The positive terminals and the negative terminals are soldered to the terminal block 7. All the secondary battery cells 6A to 6F are located in the same direction such that the surfaces marked with the plus and minus signs may be observed from above when the arrangement of the secondary battery cells 6A to 6F at the opposite sides of the terminal block 7 is obtained as described above, thereby providing the one-sided arrangement of the positive terminals and the negative terminals in a reverse direction at the opposite sides of the terminal block 7. Thereby, when the secondary battery cells 6A to 6F are bent with an angle of about 90 degrees as shown by the arrows A and B, with the secondary battery cells 6A to 6F located at the terminal block 7 as described above, a close contact of the secondary battery cells 6A to 6F located at the opposite longitudinal sides of the terminal block 7 is obtained so that the same-side surfaces may face each other, thereby enabling a thickness reduction as the whole of the battery pack 1 to be attained.

Specifically, the secondary battery cells 6A to 6F of this kind are fabricated by rolling and pressing a multi-layered structure composed of sheet-like members including a separator and an electrode etc., so that a bias arises inevitably in a thickness. The thickness bias is of course supposed to be a slight one that is not more than a crossing. Practically speaking, the secondary battery cells 6A to 6F obtained in the multi-layered arrangement in the same direction, however, cause the above slight thickness bias to be increased cumulatively, resulting in an increase of the whole thickness by a portion corresponding to the above cumulative bias. On the contrary, the secondary battery cells held in the multi-layered arrangement with the same-side surfaces facing each other like this embodiment may cancel the above slight thickness bias each other, thereby enabling a more reduction of the whole thickness to be attained accordingly, as compared with a case where the secondary battery cells in the overlapped arrangement in the same direction are obtained.

In the secondary battery cells 6A to 6F, the paired secondary battery cells 6A and 6D, those 6B and 6E and those 6C and 6F to be obtained in the multi-layered arrangement in the same direction with the same-side surfaces facing each other are connected in parallel through the terminal block 7, thereby providing the secondary battery cell pairs 6A and 6D, 6B and 6E and 6C and 6F obtained by a parallel connection. In addition, the secondary battery cell pairs 6A and 6D, 6B and 6E and 6C and 6F obtained by the parallel connection are connected in series.

Figure 3:
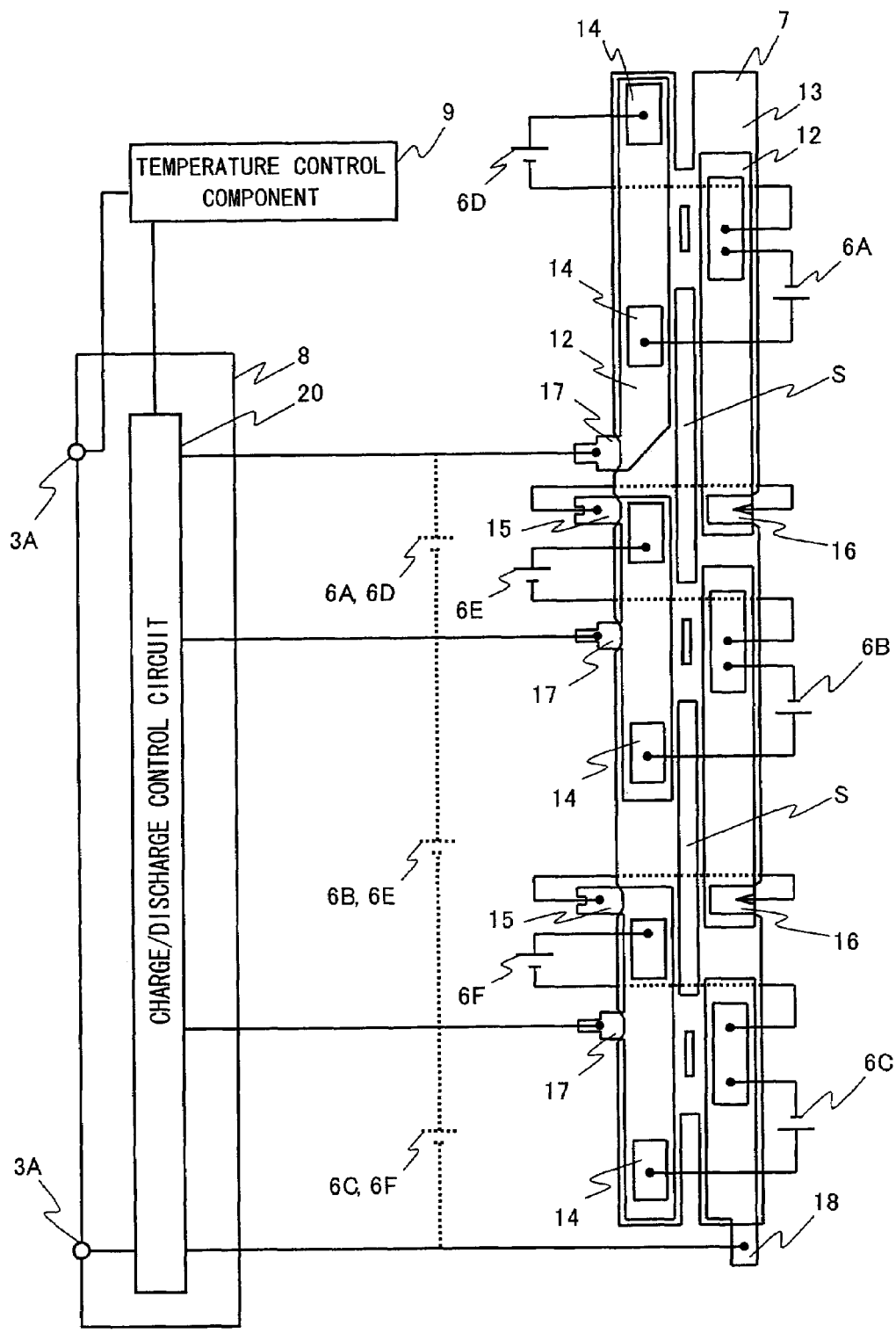
FIG. 3 is a plan view for use in a description of a terminal block applied to the secondary battery unit of FIG. 2.

The terminal block 7 used herein is formed by covering the opposite surfaces of a wiring pattern 12 consisting of a metal sheet material with an insulation sheet 13 consisting of a polyimide film, as shown in FIG. 3. The terminal block 7 is given in an elongated form, and has, in an approximately central portion extending in a longitudinal direction, elongated slits S at intervals to permit the terminal block 7 to be double-folded through the above central portion. The terminal block 7 has, at the opposite sides of the slits S, the separate-shaped wiring pattern 12 consisting of the metal sheet material, and this wiring pattern 12 is formed to have partial broken portions at longitudinal prescribed intervals.

At the back surface side of the terminal block in FIG. 3, the insulation sheet 13 is formed to approximately cover the whole surface of the wiring pattern 12, while at the surface side thereof in FIG. 3, openings adapted to form lands 14 used for a connection between the terminals of the secondary battery cells 6A to 6F and the wiring pattern 12 are formed at prescribed portions in the insulation sheet 13. Thereby, the terminal block 7 is configured to locate the wiring pattern 12 at the surface side and the back surface side, like a so-called double-sided wiring substrate, by double-folding the terminal block through portions of the central slits S so that the side having the openings faces up, and also to have the lands 14 used for the connection between the terminals of the secondary battery cells 6A to 6F and the wiring pattern 12.

Thereby, the terminal block 7 is adapted to provide the parallel connection of the secondary battery cell pairs 6A and 6D, 6B and 6E and 6C and 6F respectively obtained in the multi-layered arrangement with the same-side surfaces facing each other. Thus, when the terminal block 7 is used like the double-sided substrate as described above to provide the parallel connection of the secondary battery cell pairs 6A and 6D, 6B and 6E and 6C and 6F, respectively, the above parallel connection may be obtained by soldering the positive terminals and the negative terminals of the secondary battery cells 6A to 6F to the lands 14, with these terminals located at the back side and the surface side of the terminal block 7 in FIG. 2, thereby enabling the connection of the secondary battery cells 6A to 6F to the terminal block 7 to be attained with a simple fabrication work and besides, without fail.

The terminal block 7 further has, in one of the separated wiring patterns 12 obtained through the central slits S, projections 15 projecting sideways from the insulation sheet 13, and also, in the other wiring pattern 12, lands 16 located at portions corresponding to the projections 15. The terminal block 7 is thus adapted to provide a series connection of the secondary battery cell pairs 6A and 6D, 6B and 6D and 6C and 6F obtained by the parallel connection by bending the terminal block 7 through the portions of the slits S and by soldering the projections 15 to the lands 16, with the projections 15 bent toward the lands 16. The above arrangements allow the terminal block 7 to provide a series-parallel connection of the secondary battery cells 6A to 6F with a simple work, with the secondary battery cells 6A to 6F arranged back to back.

The terminal block 7 further has, at the side having the projections 15, projections 17 similar to the above projections 15, and also, at a longitudinal end, a projection 18. The projection 18 is located at the wiring pattern 12 to provide a connection to the positive terminals of the secondary battery cell pair 6C and 6F specified as the highest potential-side cell pair obtained by the series-parallel connection of the secondary battery cells 6A to 6F as described above. The projections 17 are located at the wiring pattern 12 at each connection point of series circuits of the secondary battery cells 6A to 6F. These projections 17 and 18 are obtained to be projecting in an approximately right-angled bent shape toward the wiring substrate 8, respectively.

The wiring substrate 8 has slits permitting insertion of the projections 17 and 18, and is adapted to provide a connection of the opposite ends of the secondary battery cell pairs 6A and 6D, 6B and 6E and 6C and 6F obtained by the parallel connection by soldering the projections 17 and 18 to the slits in an inserted condition. It is noted that in FIG. 3, the connection between the secondary battery cells 6A to 6F and the wiring substrate 8 through the terminal block 7 is represented with battery symbols given by broken lines.

At the wiring substrate 8, the connector 3A and a charge/discharge control circuit 20 adapted to control charge and discharge of these secondary battery cell pairs 6A and 6D, 6B and 6E and 6C and 6F are located. Specifically, the charge/discharge control circuit 20 is effective in preventing over-charge and over-discharge of the secondary battery cell pairs 6A and 6D, 6B and 6E and 6C and 6F by means of monitoring of inter-terminal voltages of the secondary battery cell pairs 6A and 6D, 6B and 6E and 6C and 6F, and further in controlling a stop of the charge and the discharge by means of monitoring of charge/discharge currents. Further, prevention of abnormal discharge is effected by monitoring temperatures of the secondary battery cells 6A to 6F with a thermistor (not shown).

A temperature control component 9 is composed of a series circuit of thermostats 9A and 9B and a thermal fuse 9C (See FIG. 2), and is arranged between the charge/discharge control circuit 20 and the connector 3A, thereby providing prevention of accidents of the battery pack 1. Thus, the temperature control component 9 is configured so that the series circuit of the thermostats 9A and 9B and the thermal fuse 9C is located in a clearance between the terminal block 7 and the positive and negative terminals of the secondary battery cells 6A to 6F. Thereby, the battery pack 1 provides the arrangement of the temperature control component 9 by effectively utilizing a small inside space, and this arrangement may be also applied to provide the battery pack of a smaller size and also with a smaller thickness.

(2) Operation of the Embodiment

In the battery pack 1 (see FIG. 3) having the above configuration, after the double-folded terminal block 7 is obtained, the projections 15 for use in the series connection are bent toward the lands 16 and are then soldered thereto into a completion of the fabrication of the terminal block 7. In the battery pack 1, the above double-folding of the terminal block 7 is adapted to obtain a wiring that provides the parallel connection of the secondary battery cell pairs 6A and 6D, 6B and 6E and 6C and 6F through the inter-land 14-wiring pattern 12 consisting of the metal sheet material and having, at the surface and the back surface, the lands that provides the connection of the positive terminals and the negative terminals of the secondary battery cells 6A to 6F. Also, the connection between the projections 15 and the lands 16 is adapted to obtain the connection of the wiring pattern 12 that provides the series connection of the secondary battery cell pairs 6A and 6D, 6B and 6E and 6C and 6F obtained by the parallel connection.

In the battery pack 1, the secondary battery cells 6A to 6F are arranged three at a time side by side at the opposite sides of the terminal block 7 so that the positive terminals and the negative terminals may face the terminal block 7-side (See FIG. 1). Also, the positive terminals and the negative terminals are connected to the lands 14 at the surface side and the back surface side of the terminal block 7 by soldering, respectively. Thereby, the battery pack 1 may provide a two-by-two parallel connection of the secondary battery cells 6A to 6F, and also the series connection of parallel circuits of these secondary battery cells.

In the battery pack 1, the connector 3A and the charge/discharge control circuit 20 are packaged on the wiring substrate 8 separately, and the projections 17 and 18 of the terminal block 7 obtained by the connection of the secondary battery cells 6A to 6F are soldered in an inserted condition to the slits of the wiring substrate 8, thereby providing the connection of the secondary battery cells 6A to 6F to the charge/discharge control circuit 20. Likewise, the series circuit of the thermostats 9A and 9B and the thermal fuse 9C that are obtained by assembling with a separate process is connected to the wiring substrate 8 through the terminal block 7-side, thereby providing a charge/discharge path between the charge/discharge control circuit 20 and the connector 3A.

In the battery pack 1, when the connection of the secondary battery cells 6A to 6F and others to the wiring substrate 8 is obtained as described above, the terminals of the secondary battery cells 6A to 6F are bent, thereby providing the secondary battery unit 3 in which the secondary battery cell pairs 6A and 6D, 6B and 6E and 6C and 6F obtained by the parallel connection are held in the multi-layered arrangement with the same-side surfaces facing each other (See FIG. 2), and the wiring substrate 8 and the terminal block 7 are located at the terminal side of the secondary battery cell pairs 6A and 6D, 6B and 6E and 6C and 6F.

The battery pack 1 is fabricated by arranging the upper cases 4 and 5 in sequence on the secondary battery unit 3 obtained as described above, after the above secondary battery unit 3 is housed in the lower case 2.

The battery pack 1 fabricated as described above may not cause the cumulative increase of the thickness bias in each of the secondary battery cells 6A to 6F, in other words, may provide mutual cancellation of the thickness bias among the secondary battery cells 6A to 6F obtained in the multi-layered arrangement by allowing the secondary battery cell pairs 6A and 6D, 6B and 6E and 6C and 6F obtained by the parallel connection to be held in the multi-layered arrangement with the same-side surfaces facing each other, thereby enabling a more reduction of the whole thickness as compared with the conventional technology to be attained.

A complicated connection is however, required for the secondary battery cell pairs 6A and 6D, 6B and 6E and 6C and 6F obtained in the multi-layered arrangement with the same-side surfaces facing each other, when the parallel connection is provided in pairs of two secondary battery cells 6A and 6D, 6B and 6E and 6C and 6F, as compared with a case where the multi-layered arrangement in the same direction is given. Specifically, when the positive terminals and the negative terminals are arranged in a symmetrical position about a centerline of each secondary battery cell, it may also be possible that short-circuiting accidents occur between the positive terminals and the negative terminals in the secondary battery cells obtained in the multi-layered arrangement.

On the contrary, the present battery pack 1 may provide prevention of the occurrence of the above short-circuiting accidents by allowing the positive terminals and the negative terminals of the secondary battery cells 6A to 6F to be arranged one-sided in a longitudinal direction at the side surface configured with these positive and negative terminals. In addition, a simple work requiring only soldering of the positive terminals and the negative terminals to the corresponding lands 14 after distribution of these terminals to the surface and the back surface of the terminal block 7 may be applied to provide the connection of the secondary battery cells 6A to 6F surely, with a wrong connection avoided effectively, by forming, at the surface and the back surface of the terminal block 7, the wiring pattern 12 for use in the connection of the positive terminals and the negative terminals, with these terminals arranged one-sided as described above.

In addition, a power loss attributable to the above wiring pattern may be minimized by providing the terminal block 7 fabricated by covering the opposite surfaces of the wiring pattern 12 consisting of the metal sheet material with the insulation sheet 13.

In addition, the arrangement of the charge/discharge control circuit 20 adapted to control the charge and the discharge of the secondary battery cell pairs 6A and 6D, 6B and 6E and 6C and 6F may be obtained with the effective use of a space within the battery pack 1 by providing the connection of the wiring substrate 8 to the terminal block 7 in the multi-layered arrangement. This arrangement may be also applied to provide the thickness and size reductions of the whole configuration.

(3) Effects of the Embodiment

The above configuration enables a more thickness reduction in the battery pack of the personal computer etc. as compared with the conventional technology to be attained by holding the sheet-shaped secondary battery cells in the multi-layered arrangement with the same-side surfaces facing each other.

Also, the short-circuiting accidents and the like in between the secondary battery cells obtained in the multi-layered arrangement may be effectively prevented in the secondary battery by providing the positive terminals and the negative terminals that are arranged one-sided in the longitudinal direction.

Also, the power loss reduction may be attained by providing the terminal block fabricated by covering the opposite surfaces of the wiring pattern consisting of the metal sheet material with the insulation sheet.

Also, the thickness and size reductions of the whole configuration may be attained by connecting the wiring substrate mounted with the charge/discharge control circuit adapted to control the charge and the discharge of the secondary battery cells to the terminal block in the multi-layered arrangement so as to supply the power of the secondary battery cells to the external apparatus through the wiring substrate.

Also, the simple fabrication work may be applied to attain the thickness reduction in the above configurations by connecting the positive terminals and the negative terminals of the secondary battery cells to the opposite surfaces of the terminal block to provide the series-parallel connection of the secondary batteries through the terminal block.

Specifically, the above configuration of the terminal block may provide prevention of the short-circuiting accidents and the like in between the secondary battery cells obtained in the multi-layered arrangement, besides, facilitation of the connection to the terminal block and also sure prevention of the wrong connection by providing, in the secondary battery, the positive terminals and negative terminals that are arranged one-sided in the longitudinal direction.

Also, the terminal block having, at the surface and the back surface, the lands for use in the connection may be fabricated, with the power loss reduction attained, in the above configuration of the terminal block by providing the terminal block fabricated into an approximately double-folded shape by covering the opposite surfaces of the wiring pattern consisting of the metal sheet material with the insulation sheet.

Also, the thickness and size reductions of the whole configuration may be attained in the above configuration of the terminal block by allowing the wiring substrate mounted with the charge/discharge control circuit adapted to control the charge and the discharge of the secondary battery cells to be connected in the multi-layered arrangement so as to supply the power of the secondary battery cells to the external apparatus through the wiring substrate.

(4) Other Embodiments

Although the above embodiment has been described on a case where the terminal block is used in the double-folded shape obtained through the longitudinally extending slits, the present invention is not limited to the above embodiment, and it is allowable to set a bending direction variously as needed.

Although the above embodiment has been described on a case where two pieces of secondary battery cells are connected in parallel to provide the series connection composed of three parallel connections, the present invention is not limited to the above embodiment, and it is allowable to apply the present invention widely to a case where various numbers of secondary battery cells are adapted to provide the parallel connection and further to a case where various numbers of secondary battery cell layers are adapted to provide the series connection.

Although the above embodiment has been described on a case where the present invention is applied to the battery pack of the personal computer, the present invention is not limited to the above embodiment, and it is allowable to apply the present invention widely to the battery packs of various kinds of apparatuses.

As described above, according to the present invention, the more thickness reduction in the battery pack of the personal computer etc. as compared with the conventional technology may be attained by holding the sheet-shaped secondary battery cells in the multi-layered arrangement with the same-side surfaces facing each other.

The simple fabrication work may be applied to attain the thickness reduction in the above configuration by connecting the positive terminals and the negative terminals of the secondary battery cells to the opposite surfaces of the terminal block to provide the series-parallel connection of the secondary battery cells through the terminal block.

INDUSTRIAL APPLICABILITY

The present invention relates to the battery pack, which is applicable to the power supply of the portable personal computer, for instance.

The invention claimed is:

1. A battery pack, comprising:
   a secondary battery unit formed by a connection of more than one sheet-shaped secondary battery through a terminal block; and
   an exterior case adapted to hold said secondary battery unit so as to allow a power of said secondary battery unit to be supplied to an external apparatus,
   wherein,
   said secondary battery has, on one width end surface, a positive terminal and a negative terminal,
   said secondary battery unit has more than one secondary battery cell pair obtained by a multi-layered thickness-wise arrangement of said more than one secondary battery cell with their respective positive and negative terminals facing the same direction,
   provides a sequentially width-wise arrangement of said more than one secondary battery cell pair, and is fabricated by providing, through said terminal block, a connection of said positive terminal and said negative terminal of each secondary battery cell, and
   each of said secondary battery cell pairs is provided in a multi-layered arrangement, such that one terminal of one battery of the second battery cell pair oppositely faces a polarity opposite terminal of the other battery of the second battery cell pair along the thickness of the second battery cell pair.

2. The battery pack according to claim 1, wherein said terminal block is fabricated by covering the opposite surfaces of a wiring pattern consisting of a metal sheet material with an insulation sheet.

3. The battery pack according to claim 1, wherein said terminal block allows a wiring substrate mounted with a charge/discharge control circuit adapted to control charge and discharge of said secondary battery cells to be connected thereto in a multi-layered arrangement so as to supply the power of said secondary battery cells to said external apparatus through said wiring substrate.

4. The battery pack according to claim 1, wherein said terminal block provides a connection of the positive terminals and the negative terminals of said secondary battery cells to lands formed at a surface and a back surface, such that the secondary battery cell pairs are connected in parallel.

5. The battery pack according to claim 4, wherein said terminal block is fabricated in an approximately double-folded shape by covering the opposite surfaces of the wiring pattern consisting of a metal sheet material with an insulation sheet.

6. The battery pack according to claim 4, wherein said terminal block allows a wiring substrate mounted with a charge/discharge control circuit adapted to control charge and discharge of said secondary battery cells to be connected thereto in a multi-layered arrangement so as to supply the power of said secondary battery cells to the external apparatus through said wiring substrate.

* * * * *